UNITED STATES PATENT OFFICE.

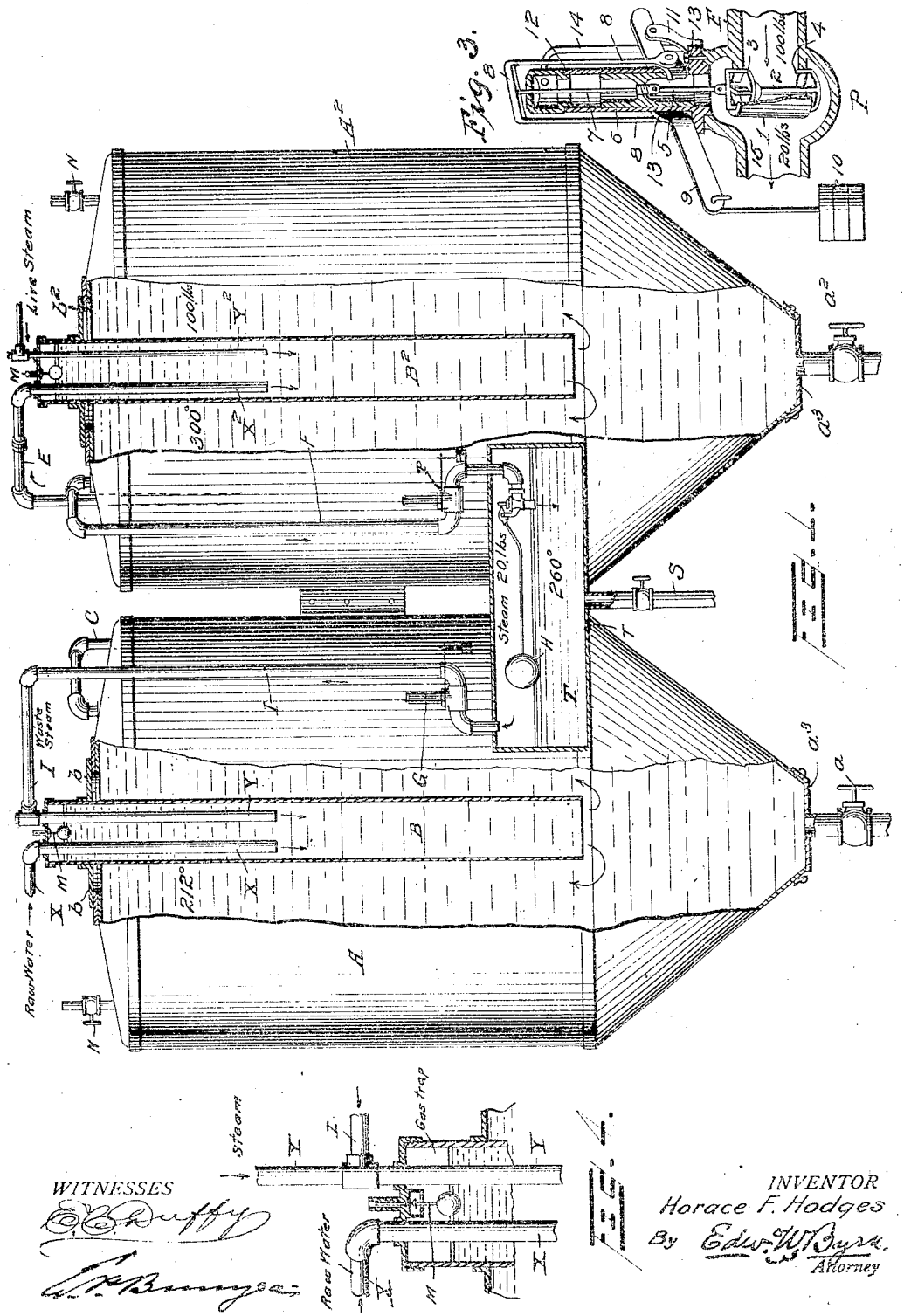

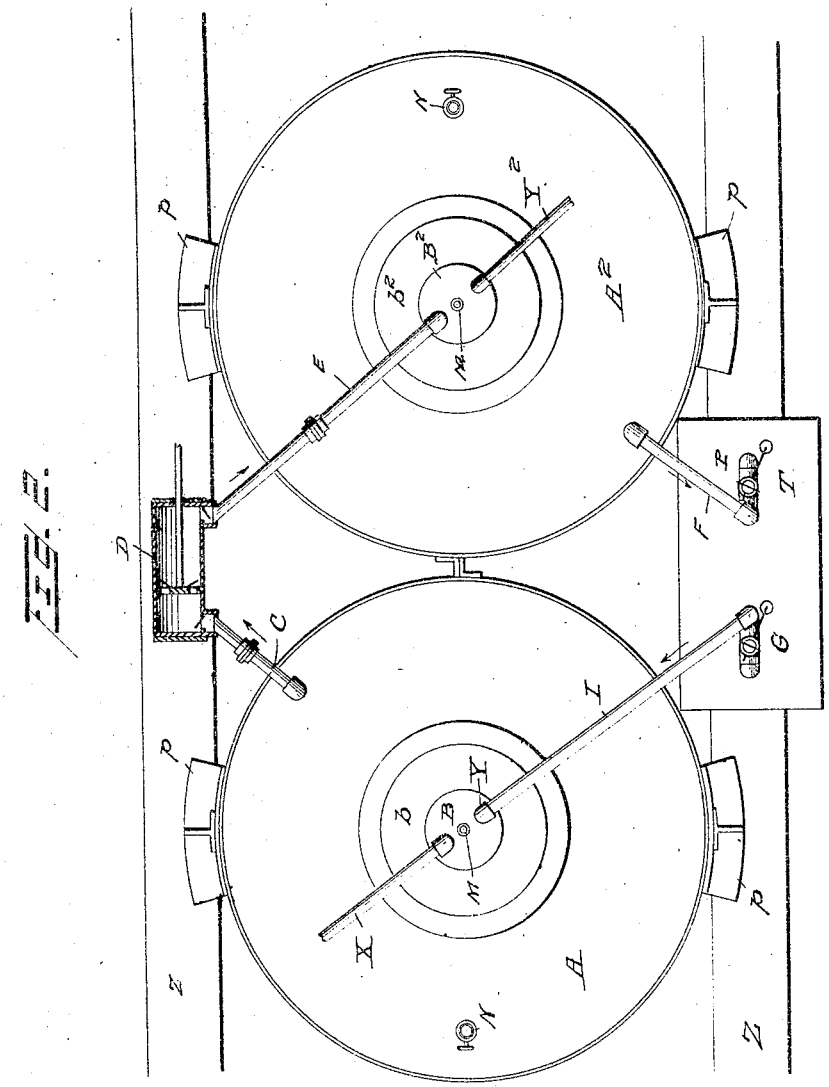

HORACE F. HODGES, OF PHILADELPHIA, PENNSYLVANIA.

PROCESS FOR THERMAL WATER PURIFICATION.

1,060,901.  Specification of Letters Patent.  Patented May 6, 1913.

Application filed June 25, 1912. Serial No. 705,714.

*To all whom it may concern:*

Be it known that I, HORACE F. HODGES, a citizen of the United States, residing at Philadelphia, in the county of Philadelphia and State of Pennsylvania, have invented certain new and useful Improvements in Processes for Thermal Water Purification, of which the following is a specification.

In the distillation of water by processes and apparatus such, for instance, as set forth in the Patents Nos. 798,901, 798,964, 799,002 and 799,003, granted in part to me as co-inventor, it is very desirable that the impurities, and especially the mineral impurities, such as the carbonates and sulfates of the alkaline earths and other salts, be eliminated by a preliminary purification, so as to avoid precipitating these impurities in the still and fouling its condensing surfaces with scale.
My present invention is designed to provide a process for eliminating these impurities from the water before being admitted to the still, and it proceeds along the known method of purifying by thermal precipitation in which the soluble mineral impurities are converted by heat into insoluble forms which are precipitated or thrown down and thus eliminated. The purpose in mind is to so apply the heat to the water that the resulting precipitate cannot impair the efficiency of the apparatus by the formation of scale on heat conducting surfaces, as would be the case with a coil or other arrangement without my invention.
My invention provides a process for the continuous purification of water and elimination of gases while in transit and one designed to meet the different conditions under which the carbonates and sulfates are eliminated as regards the peculiar chemical and physical conditions of precipitation which characterize these two different groups of chemical substances; that is to say, in general terms, my process comprises the treatment of the water to be purified by subjecting it to heat and pressure in two different stages of heat and pressure, i. e., a relatively low temperature and pressure to precipitate the carbonates, and a second higher temperature and pressure to precipitate the sulfates, and providing also means for economically and automatically reducing the temperature and pressure before turning the purified water into the still and also for returning the disengaged steam to the apparatus of the first stage to aid in the heating and precipitation of the carbonate impurities and for also further cooling the purified water without exposure to air, or the use of surface condensers, as will be hereinafter more fully described with reference to the drawings, in which:

Figure 1 is a side elevation of an apparatus for carrying out my invention, the view being partly broken away. Fig. 2, a plan view of the same. Fig. 3, a sectional detail of a pressure regulating and reducing valve employed in the process, and Fig. 4 is an enlarged sectional detail of the upper part of the apparatus.

In the drawing A is a container in which the precipitation of the alkaline carbonates in the first stage of the operation is carried out, and $A^2$ a similar container in which the precipitation of the alkaline sulfates in the second stage of the operation is carried out. These containers are preferably upright closed cylinders of boiler iron, having tapering bottoms and blow-off or discharge pipes with valves $a$ and $a^2$ in said bottoms by which the precipitated sediment is removed, and also removable plates $a^3$ acting as manholes. These containers are held in upright suspended position by any suitable means, preferably flanged plates $p$, Fig. 2, riveted to the sides of the container on each side and resting upon side walls or horizontal I-beams Z.

D is a force pump which takes the partially purified water from the first container A and forces it into the other container $A^2$, where it is treated at a higher temperature and pressure, and T is an expansion tank which receives the purified water from the container $A^2$ and, through pressure regulating reducing valves and float valve hereafter described reduces the pressure, cools the purified water without contact with the air and without a surface condenser, or surfaces liable to be incrusted with scale, and passes disengaged steam of low pressure to the first container, as will be more fully described hereafter. The two containers are built substantially alike. Each has suspended in it a pendent cylinder B and $B^2$ supported concentrically within the same from the top of the container by means of a flanged collar $b$ and $b^2$, the opening in the top of the container being larger than the diameter of cylinders B, $B^2$, for the purpose hereafter described, and said cylinders rising above and protruding from the top of the container a short distance, as shown, and descending at its lower end to a point near the bottom of the containers and being open at its lower end. The cylinders B and B² are closed at their upper ends and open at their lower ends and form a central zone for water of limited cross section surrounded by a concentric zone of much larger cross section in communication with each other at the bottom. Into the cylinder B from the top there descends a short distance an inlet pipe X for raw water to be purified and also an inlet pipe Y for steam of low pressure, approximately two pounds, which steam comes, in part, from the tail end of the still, not shown, but referred to in the aforementioned patents, or from any other source. This steam pipe carries the steam which effects the heating of the water in cylinder B and container A to about 210° to 212°. The lower end of steam pipe Y opens into cylinder B, and as this steam enters the water in cylinder B it acts thereupon to precipitate the alkaline carbonates which are thrown down at this temperature, the partially purified water passing down and out through the bottom of cylinder B and rising with a slow motion and in a condition of almost quiescence in the larger diameter of the container A, during which slow movement time is allowed for the practically complete settling of the precipitated sediment of the carbonate which is thrown down at this temperature and pressure.

From the top of the container A the partially purified water is drawn off through pipe C by a force pump D, which is so organized as to increase the pressure of the water from no pressure in container A to the high pressure of one hundred pounds, more or less, in the container A², the pump delivering such water at this higher pressure through the pipes E and X² into the top of the cylinder B² of the other container. The pipe X² enters said container through the top of the cylinder B² in the same relation that raw water pipe X enters the cylinder of the first container, and into the top of the cylinder B² is also entered a live steam pipe Y², corresponding to Y in container A, which steam pipe Y² introduces steam of a temperature and pressure sufficient to raise the partially purified water in this container to approximately one hundred pounds pressure and 300°, or below the boiling point at this pressure. At such temperature and pressure the sulfates of the alkaline earths and other bases are precipitated and thrown down through the open lower end of cylinder B² and the purified water rises around the outside of cylinder B², allowing complete sedimentation to occur by the slow movement, and the purified water now passes, from the action of the force pump, out through the top of the container, by way of pipe F, to the intermediate expansion tank T. In this intermediate tank T two important results are accomplished; first, the automatic cooling of the purified water without a surface condenser and without exposure to the air; and, secondly, the conservation of the disengaged steam for re-use in the container of the first stage. This is accomplished by the following instrumentalities, viz: an automatic pressure reducing valve P and a level regulating float valve H. The float valve is of any of the types employed in water closet flush tanks to maintain a constant level of water in tank T, i. e., when the level falls the float falls and the valve admits water to the tank T through pipe F, and when the level of the water (and the float) rises the valve closes automatically the further inflow of water to the tank.

The pressure regulating reducing valve P is shown in detail in Fig. 3. Its function is to reduce the pressure and also make the fixed final pressure independent of the initial pressure.

Referring to Fig. 3, F is the high pressure inlet pipe and the opposite side is the low pressure outlet side. The valve shown is what is known as the Davis pressure regulating valve, but any other pressure regulating reducing valve may be employed. In the form shown 1 is a short cylinder open at top and bottom within a valve casing and in communication with the high pressure pipe F. In the cylinder plays vertically a balanced valve consisting of a stem 2 with upper valve 3 and lower valve 4. This valve is connected by link 5 with piston 6 in cylinder 12. Stem 7 connects the piston with external yoke 8 and this yoke in turn is connected to a ring 13 of lever 9 having on its end weight 10. High pressure fluid coming in pipe F at, say, 100 pounds issues through upper valve 3 and lower valve 4 and raises piston 6 against weighted lever 9, whose weights determine the reduced pressure on the left hand side 15 of cylinder 1, which we will suppose is normally 20 pounds. If the latter pressure rises, the piston 6 rises and closes the balanced valve 3, 4. If it falls, the piston descends and opens wider the balanced valve 3, 4.

Now, when the purified water enters tank T through pipe F, the level in tank T is maintained substantially constant by the float valve and when the pressure in the tank is reduced by the valve P, the following result takes place in accordance with well known physical laws. When the pressure is reduced in tank T by the reducing valve P from the high pressure of 100 pounds and temperature of 300° of the container A², there is at once in tank T a disengagement of steam from said overheated water with both a lowering of temperature and pressure. Thus, if the pressure is reduced from 100 pounds to 20 pounds and the temperature falls from 300° in container $A^2$ to 260° in tank T, the disengagement of latent heat incident to evaporation causes the water in tank T to be cooled automatically and without surface condenser, or exposure to air, to the temperature at which it is desirable to introduce it to the still, and the disengaged steam passes from tank T through pipe I to the pipe Y, where it mingles with and supplements the low pressure waste steam passing from the still into the first container. To bring this steam from tank T down from 20 pounds to the lower pressure of 2 pounds employed in pipe Y, a reducing valve G is placed in the pipe I, which is of substantially the same construction as that shown at P in Figs. 1 and 3. The cooled and purified water, relieved now of the scale producing constituents of both the carbonate and sulfate class, is then taken through pipe S and tank T and carried to the still, where it is further purified by distillation according to the method of the patents hereinbefore named, or used for any other purpose to which it may be desired to put it.

Incident to the chemical changes which take place in the precipitation of the impurities, there will be disengaged certain corrosive gases, notably carbon dioxid, which will accumulate in the top of the containers and cylinders. The principal portion of these will be found in the cylinders B and $B^2$ and their automatic vent or discharge is effected by a float valve M, see Fig. 4, which opens and discharges the gases whenever they accumulate sufficiently to force down the level of the water in the top of the cylinders, the valve closing automatically when the gases escape and the float rises again. It will be seen that the automatically discharging gas valve M is in the top of the central cylinder or mixing tube, B or $B^2$, and its location here is important, for the reason that when the hot steam comes into the relatively small cylinder of limited cross section the maximum heat is confined to the small area of the cylinder and the principal separation of the gases is made to take place here immediately and be easily and automatically vented before it gets into the larger area of the outer settling container where it would be liable to be reabsorbed and more troublesome to eliminate and would be liable also to interfere with the action of the circulating pump. For such gases as accumulate in the top of the containers these may be discharged from time to time by a valved vent pipe N, or an automatic valve M, if desired.

In my invention it will be seen that the water is purified continuously in transit; that is to say, in the cylinders B and $B^2$ the temperatures are adjusted to the precipitation of the two principal impurities, the carbonates and the sulfates, and as the water rises on the exterior of the cylinders B and $B^2$ in the far greater cross section of the containers A and $A^2$ the movement is rendered so slow that time for complete subsidence of the precipitated impurities is allowed, so that the process is continuously and consecutively carried on in a practical and efficient manner.

One of the advantages of my invention, in addition to those already named, is that the high temperature and pressure in the second container perfectly sterilizes the water of all germs, the value of which is obvious.

The advantage of making the opening in the top of the container larger than the depending cylinder, and supporting the same by a collar $b$ or $b^2$, is that it permits the easy removal of the cylinders for cleaning purposes, if any incrustation is deposited on its sides, and it also serves as a manhole for entering and cleaning the container and cylinder, as do also the detachable bottoms $a^3$.

I do not claim broadly the precipitation of the salts of the alkaline earths by heat, as I am aware that this general principle is old and well known. I, furthermore, do not in this case claim the apparatus herein shown and described, as the same has been made the subject-matter of another subsequent application, filed February 18, 1913, Serial No. 749,114.

I claim:

1. The process of continuously purifying water by thermal precipitation, which consists in elevating its temperature within a central zone of limited cross section, automatically venting the gases from the top of this limited zone, continuously moving the water first downwardly in this limited zone and then upwardly in a surrounding zone of larger cross section to allow time and sufficient quiescence for subsidence of the precipitate and removing the precipitated sediment from the bottom of both zones.

2. The process of continuously purifying water by thermal precipitation, which consists in introducing steam directly into a central zone of water of limited cross section, automatically venting the gases from the top of this limited zone, continuously moving the water first downwardly in this limited zone and then upwardly in a surrounding zone of larger cross section to allow time and sufficient quiescence for subsidence of the precipitate, and removing the precipitated sediment from the bottom of both zones.

3. A thermal water purifying process, comprising the treatment of water by heat in two stages of temperature and pressure, the first stage being a relatively low one sufficient to precipitate the carbonates, and the second stage being a higher one to precipitate the sulfates, then reducing automatically in continuous operation the temperature and pressure by evaporation within a closed chamber.

4. A thermal water purifying process, comprising the treatment of the water by steam in two stages of temperature and pressure, the first stage being a relatively low one sufficient to precipitate the carbonates and the second stage being a higher one as to temperature and pressure to precipitate the sulfates, then reducing automatically the temperature and pressure, drawing off the purified water and returning the surplus steam to the treatment of the water in the first stage.

5. A thermal water purifying process, comprising the treatment of the water by steam in two stages of temperature and pressure, the first stage being a relatively low one sufficient to precipitate the carbonates, and the second stage being a higher one as to temperature and pressure to precipitate the sulfates, drawing off automatically the liberated gases, then reducing automatically the temperature and pressure of the second stage, drawing off the purified water and returning the surplus steam to the treatment of the water in the first stage.

6. A thermal water purifying process, comprising the treatment of the water by steam in two stages of temperature and pressure, the first stage being a relatively low one sufficient to precipitate the carbonates and the second stage being a higher one as to temperature and pressure to precipitate the sulfates, then reducing automatically the temperature and pressure by the direct evaporation of the highly heated water within a confined space through the agency of pressure reducing and level regulating valves, drawing off the purified water and returning the newly evaporated steam of lower pressure to the treatment of the water in the first stage.

7. A thermal water purifying process, comprising the treatment of water in a vessel by steam at a relatively low temperature and pressure to precipitate the carbonates, then pumping the water into another vessel and maintaining it at a higher pressure, introducing live steam at a relatively high temperature and pressure to precipitate the sulfates, automatically reducing the temperature and pressure by the direct evaporation of the highly heated water within a confined space through the agency of pressure reducing and level regulating valves, drawing off the purified water and returning the newly evaporated steam of lower pressure to the treatment of the water in the first stage.

In testimony whereof I affix my signature in presence of two witnesses.

HORACE F. HODGES.

Witnesses:
 JOHN H. DUVAL,
 JOHN L. FLETCHER.